United States Patent [19]
Hasegawa

[11] Patent Number: 5,638,253
[45] Date of Patent: Jun. 10, 1997

[54] PACKAGE-TYPE SOLID ELECTROLYTIC CAPACITOR

[75] Inventor: Miki Hasegawa, Kyoto, Japan

[73] Assignee: Rohm Co. Ltd., Kyoto, Japan

[21] Appl. No.: 429,694

[22] Filed: Apr. 27, 1995

[30] Foreign Application Priority Data

Apr. 28, 1994 [JP] Japan .................................. 6-092114

[51] Int. Cl.⁶ .............................................. H01G 2/10
[52] U.S. Cl. ........................ 361/535; 361/528; 361/532; 361/523; 361/537
[58] Field of Search ........................... 361/301.3, 308.2, 361/321.6, 523, 528, 534, 445, 535, 820, 532, 540, 500; 174/52.4

[56] References Cited

U.S. PATENT DOCUMENTS

| | | |
|---|---|---|
| 4,231,075 | 10/1980 | Morimoto et al. |
| 4,663,824 | 5/1987 | Kenmochi ........................ 29/25.03 |
| 5,041,696 | 8/1991 | Ferdinand ........................ 174/52.4 |

FOREIGN PATENT DOCUMENTS

| | | | |
|---|---|---|---|
| 338490A | 10/1989 | European Pat. Off. ............... | 361/820 |
| 60-220922 | 11/1985 | Japan . | |
| 1200206 | 7/1970 | United Kingdom . | |

*Primary Examiner*—Michael W. Phillips
*Assistant Examiner*—Anthony Dinkins
*Attorney, Agent, or Firm*—Michael D. Bednarek; Kilpatrick Stockton LLP

[57] ABSTRACT

A package-type solid electrolytic capacitor is provided which comprises a capacitor element, an insulating package body having a housing recess with an upward opening for receiving the capacitor element, and an insulating closure member for closing the opening of the housing recess. The capacitor element has an anode layer formed on one end and a cathode layer formed at least on the other end. The housing recess is formed with two internal electrodes in electrical conduction with the anode and cathode layers, respectively, of the capacitor element. The package body is externally formed with two terminal electrodes in electrical conduction with the respective internal electrodes.

11 Claims, 5 Drawing Sheets

PACKAGE-TYPE SOLID ELECTROLYTIC CAPACITOR

BACKGROUND OF THE INVENTION

1. Field of the Invention

This invention relates to a solid electrolytic capacitor such as tantalum capacitor or aluminum capacitor. More particularly, the present invention relates to a package-type solid electrolytic capacitor wherein a capacitor element is enclosed in an insulating package for protection.

2. Description of the Related Art

In general, a solid electrolytic capacitor comprises a capacitor element which includes a porous chip of a sintered compacted valve metal powder which works as an anode. The chip is first treated to form a dielectric layer on the metal particles, and then treated to form a solid electrolyte layer over the dielectric layer. The solid electrolyte layer, which works as a cathode, is covered by a cathode electrode layer.

The solid electrolytic capacitor is known to provide a high capacitance per unit volume. However, such a capacitor has been found disadvantageous for its poor resistance to impacts and moisture.

To solve this problem, it is a usual practice to enclose the capacitor element in an insulating resin package which is molded with the capacitor element, as disclosed in Japanese Patent Application Laid-open No. 60-220922 for example. For establishing electrical connection of the capacitor element to an external circuit, the capacitor element has an anode wire which is attached to a plate-like anode lead, whereas the cathode electrode layer is attached to a plate-like cathode lead. The anode and cathode leads project out of the resin package and are bent toward the underside of the package for mounting to a surface of a printed circuit board.

However, the solid electrolytic capacitor described above is still disadvantageous in the following respects.

First, since the resin package is molded with the capacitor element, the latter is inevitably subjected to a molding pressure which is relatively high. Thus, the capacitor element undergoes stresses which may damage or adversely influence the capacitor element. For instance, the capacitor element may suffer from an increased leak current (LC) or electrical shorting.

Secondly, since the anode wire projects from the capacitor chip, the resin package must be large enough to enclose the anode wire. Thus, the anode wire adds to the overall size and weight of the packaged capacitor. Further, the anode and cathode leads extend laterally within the package, so that these leads are also additional to the size and weight of the package.

In the third place, since the respective leads need be attached to the capacitor element and then bent outside the package, the attaching and bending steps result in an increase of the production cost.

SUMMARY OF THE INVENTION

It is, therefore, an object of the present invention to provide a package-type solid electrolytic capacitor which is capable of providing an increased volume or space efficiency while also preventing damages or adverse influences on the capacitor element.

According to the present invention, there is provided a package-type solid electrolytic capacitor comprising:

a capacitor element including a chip of a compacted metal powder mass, an anode layer formed on a first end of the chip, and a cathode layer formed at least on a second end of the chip opposite to the first end;

an insulating package body having a housing recess with an upward opening for receiving the capacitor element, the housing recess being formed with an anode-side internal electrode in electrical conduction with the anode layer of the capacitor element, the housing recess being also formed with a cathode-side internal electrode in electrical conduction with the cathode layer of the capacitor element, the package body being externally formed with an anode terminal electrode in electrical conduction with the anode-side internal electrode, the package body being also externally formed with a cathode terminal electrode in electrical conduction with the cathode-side internal electrode; and an insulating closure means for closing the opening of the housing recess.

The closure means may comprise a lid member attached to the package body to close the opening of the housing recess. The lid member may be preferably made of an insulating resin.

Alternatively, the closure means may comprise an insulating resin poured into the housing recess to a level of the opening of the housing recess.

In either case, the capacitor element is substantially free of any molding or injection pressure. Thus, the capacitor element can be prevented from being adversely influenced by stresses which would result from pressure application.

Each of the respective electrodes is formed by applying an electrically conductive paste onto the package body. Alternatively, the package body may be made of a metal platable insulating resin, and each of the respective electrodes may be formed by plating the package body with a metal.

Each of the anode-side and cathode-side internal electrodes may be electrically connected to a corresponding one of the anode and cathode terminal electrodes by at least one conductor part extending in a through-hole formed in a wall thickness of the package body.

Each of the electrodes may be made of a metal plate, and the package body may be made of an insulating resin molded with the plate electrodes. In this case, each of the internal electrodes may be preferably connected to a corresponding one of the terminal electrodes by a connecting web or block.

Other objects, features and advantages of the present invention will be fully understood from the following detailed description given with reference to the accompanying drawings.

DETAILED DESCRIPTION OF THE PREFERRED EMBODIMENTS

Figure 1:
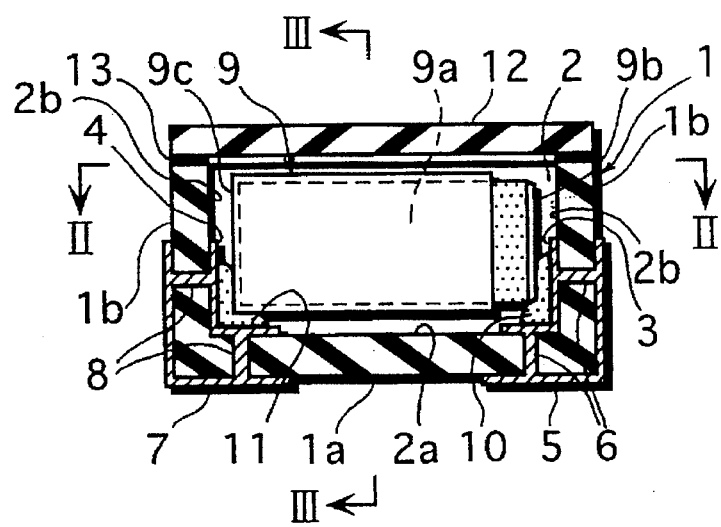
FIG. 1 is a front view, in vertical section, showing a package-type solid electrolytic capacitor according to a first embodiment of the present invention.
Figure 2:
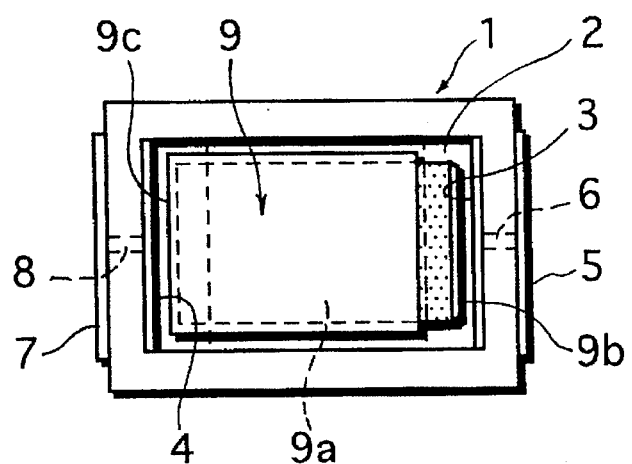
FIG. 2 is a plan view of the same capacitor as seen in a direction of arrows II—II in FIG. 1.
Figure 3:
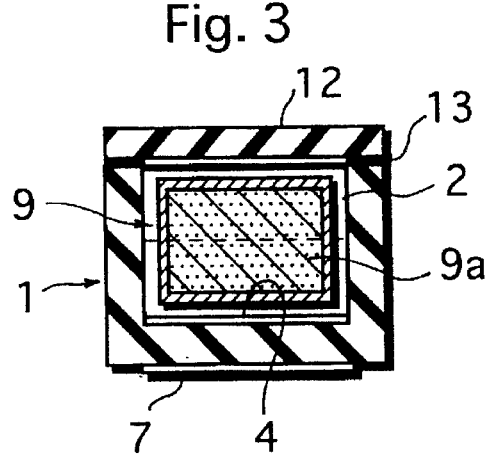
FIG. 3 is a sectional view of the same capacitor taken on lines III—III in FIG. 1.
Figure 4:
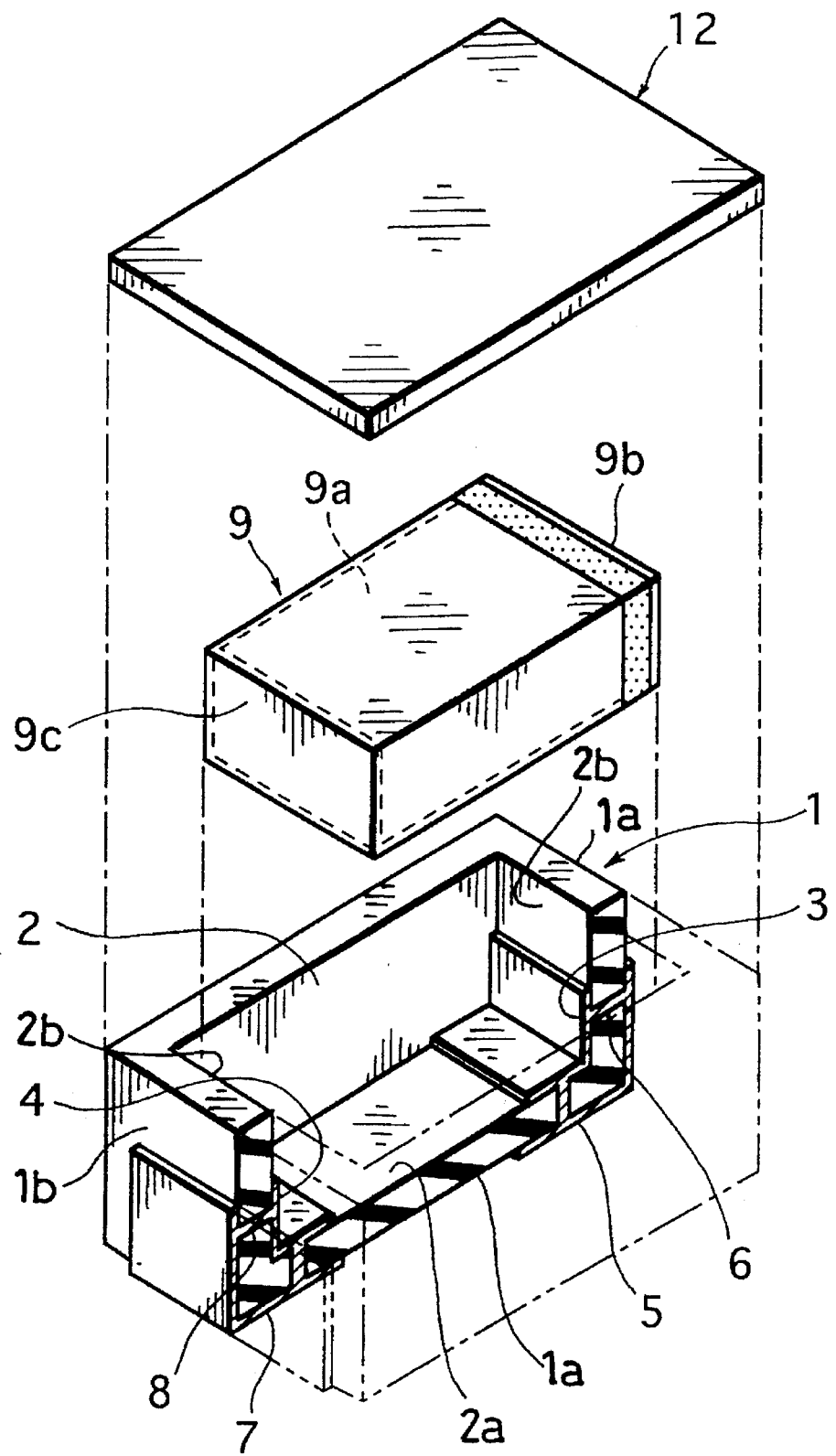
FIG. 4 is an exploded perspective view showing the same capacitor.

Referring first to FIGS. 1 through 4 of the accompanying drawings, there is shown a package-type solid electrolytic capacitor according to a first embodiment of the present invention. The capacitor may be a tantalum capacitor or an aluminum capacitor for example. The capacitor of the first embodiment mainly comprises a package body 1 made of an insulating material such as synthetic resin, a capacitor element 2 housed in the package body 1, and a lid member 12 for closing the package body 1.

The package body 1 has an upwardly open housing recess 2 which is provided with an anode-side internal electrode 3 and a cathode-side internal electrode 4 at respective ends of the recess 2. Each of the internal electrodes 3, 4 is perpendicularly angular and extends from the bottom face 2a of the recess 2 to a corresponding internal end face 2b of the recess 2.

One end of the package body 1 is externally provided with an anode terminal electrode 5 which is electrically connected to the anode-side internal electrode 3 by conductor parts 6 extending in a set of through-holes formed in the wall thickness of the package body 1. Similarly, the other end of the package body 1 is externally provided with a cathode terminal electrode 7 which is electrically connected to the cathode-side internal electrode 4 by conductor parts 8 extending in another set of through-holes formed in the wall thickness of the package body 1. Each of the terminal electrodes 5, 7 is also perpendicularly angular and extends from the bottom face 1a of the package body 1 to a corresponding external end face 1b of the package body 1.

Each of the internal and terminal electrodes 3, 4, 5, 7 may be formed by applying a conductive paste onto the package body 1 and drying the applied paste for fixation. The conductor parts 6, 8 may be formed by loading a conductive paste into the respective through-holes which are formed at the time of molding the package body 1.

The capacitor element 9 includes a chip 9a which is a sintered compacted mass of valve metal powder, (e.g. tantalum powder). One end of the chip 9a is formed with an anode layer 9b. The other end of the chip 9a is formed with a cathode layer 9c which, according to the illustrated embodiment, extends onto the side faces of the chip 9a toward the anode layer 9b.

The capacitor element 9 is arranged in the housing recess 2 of the package body 1 and fixed in place by conductive adhesive deposits 10, 11. The anode and cathode layers 9b, 9c of the capacitor element 9 are held in electrical conduction with the anode-side and cathode-side internal electrodes 3, 4 by the respective conductive adhesive deposits 10, 11.

The housing recess 2 is closed by the lid member 12 which is made of an insulating material such as synthetic resin. The lid member 12 may be attached to the top of the package body 1 by an insulating adhesive layer 13.

In this way, the capacitor element 9 can be sealingly enclosed in the package body 1 combined with the lid member 12 attached thereto. In use, the capacitor can be mounted on a printed circuit board or the like by soldering at the respective terminal electrodes 5, 7.

The capacitor of the above-described arrangement has the following features or advantages.

(1) Since the capacitor element 9 is accommodated in the housing recess 2 of the package body 1 which is molded separately, the capacitor element 9 does not suffer from damages or adverse influences which would occur if the resin package body 1 is molded together with the capacitor element 9 (which is significantly stressed) as in a conventional package-type solid electrolytic capacitor. Such damages or adverse influences may include an increase of leak current (LC), electrical shorting, and etc.

(2) Since a conventional anode wire is replaced by the anode layer 9b which is not significantly additional to the length of the capacitor element 9, the capacitor as a whole including the package body 1 can be reduced in overall size.

(3) Since the respective internal electrodes 3, 4 as well as the respective terminal electrodes 5, 7 are not significantly additional in size and weight, this also contributes to a reduction in the overall size and weight of the capacitor. Thus, combined with the feature (2) above, the volume or space efficiency of the capacitor can be significantly increased in comparison with a conventional package-type solid electrolytic capacitor.

(4) Since the respective terminal electrodes 5, 7 need not be mechanically bent from a straight form and subsequently attached to the respective pole layers 9b, 9c of the capacitor element 9, the capacitor as a whole can be produced easily. As a result, the manufacturing cost of the capacitor can be reduced.

The respective internal electrodes 3, 4 as well as the respective terminal electrodes 5, 7 may be formed by plating, as described below.

First, the package body 1 as a whole is made of a metal platable resin such as liquid crystal polymer (LCP). Then, portions of the package body 1 where no electrode is to be formed are treated to become non-platable, and through-holes for the conductor parts 6, 8 are formed in the wall thickness of the package body 1. Finally, the package body 1 as a whole is subjected to plating. As a result, the remaining platable portions of the package body 1 are plated with a metal to form the respective internal electrodes 3, 4, the respective terminal electrodes 5, 7, and the conductor parts 6, 8.

Alternatively, the package body 1 as a whole is made of a metal platable resin such as liquid crystal polymer (LCP), and through-holes for the conductor parts 6, 8 are formed in the wall thickness of the package body 1. Then, the package body 1 as a whole is subjected to plating. Finally, the plated metal layer is removed away by photoetching or laser-trimming at the portions of the package body 1 where no electrode is to be formed.

The capacitor element 9 may be preferably produced by the method disclosed in Japanese Patent Application Laid-open Nos. 6-252008, 6-252009 and 6-252010 which are incorporated herein by reference.

Figure 5:
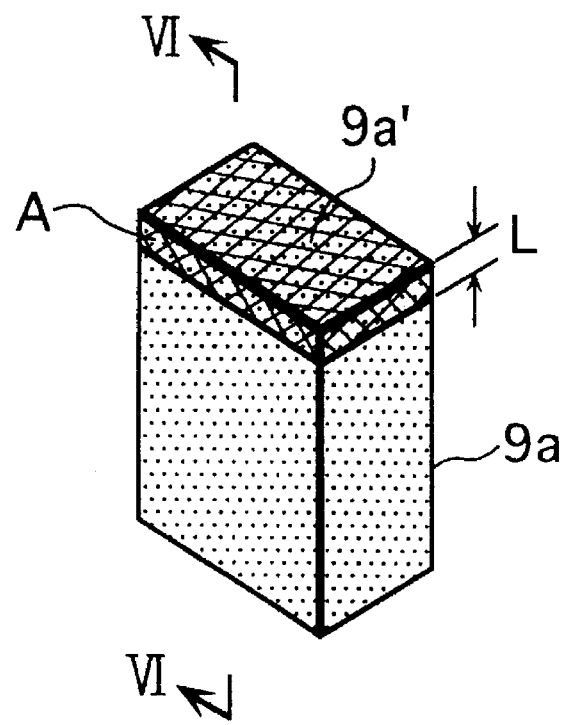
FIG. 5 is a perspective view showing a capacitor chip for use in the capacitor illustrated in FIGS. 1-4.
Figure 6:
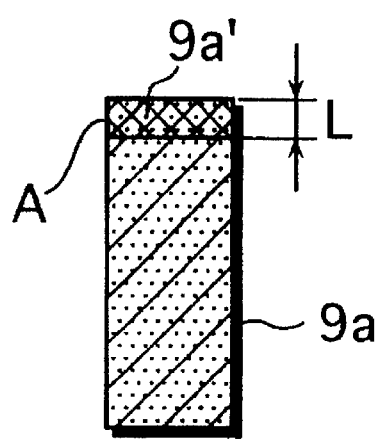
FIG. 6 is a sectional view of the same capacitor chip taken along lines VI—VI in FIG. 5.

Specifically, as shown in FIGS. 5 and 6, a chip 9a which is a porous sintered compacted mass of metal powder (e.g. tantalum powder) is made to have a non-porous portion A of a length (thickness) L at one end 9a'. The non-porous portion A may be formed by impregnating the chip end 9a' with resin, compacting the chip end 9a' to a super high density, or attaching a metal plate to the chip end 9a'.

Then, the porous portion of the chip 9a is immersed in a chemical solution (e.g. aqueous solution of phosphoric acid) to form a dielectric oxide layer (e.g. tantalum pentoxide) on the metal particles (e.g. tantalum particles) by anodic oxidation.

Then, the porous portion of the chip 9a is subjected to formation of a solid electrolyte layer (e.g. manganese dioxide) over the dielectric layer by repeating the process of immersing the chip porous portion in an aqueous solution of manganese nitrate and thereafter lifting the chip out of the solution for baking. At this time, the non-porous portion 9a' of the chip 9a prevents the manganese nitrate solution from penetrating into the non-porous portion 9a', so that the metal particles (e.g. tantalum particles) are held insulated from the electrolyte layer.

Figure 7:
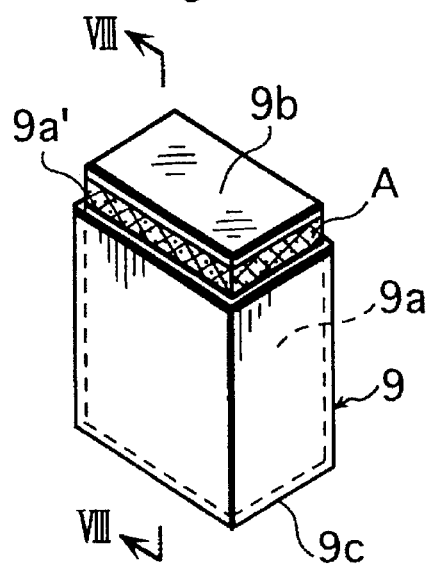
FIG. 7 is a perspective view showing a capacitor element made by using the capacitor chip shown in FIGS. 5 and 6.
Figure 8:
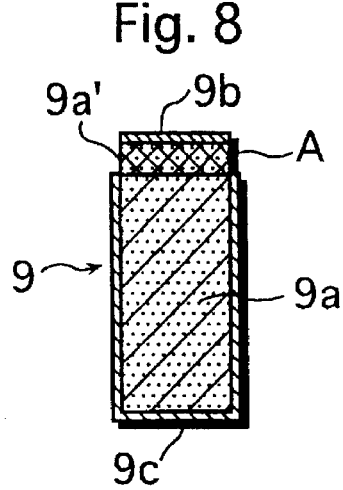
FIG. 8 is a sectional view of the same capacitor element taken along lines VIII—VIII in FIG. 7

Then, after performing a surface treatment (e.g. grinding) to partially expose the metal particles at the chip end 9a', an anode terminal electrode 9b is formed on the chip end 9a', whereas a cathode terminal electrode 9c is formed over the chip 9a except the non-porous portion A, as shown in FIGS. 7 and 8. Each of the terminal electrodes 9b, 9c may be provided by first forming a graphite layer and thereafter forming a metal layer (e.g. silver or nickel layer) over the graphite layer. Of course, the order of forming the respective terminal electrodes 9b, 9c is optional.

In this way, the capacitor element 9 is produced which has the anode and cathode terminal electrodes 9b, 9c formed on the chip 9a.

The capacitor of the first embodiment described above may be slightly modified so that the respective internal electrodes 3, 4 and the respective terminal electrodes 5, 7 extend further upward to join each other on the top face of the package body 1. With such a modification, the conductor parts 6, 8 for electrically connecting between the respective internal electrodes 3, 4 and the respective terminal electrodes 5, 7 may be dispensed with.

Figure 9:
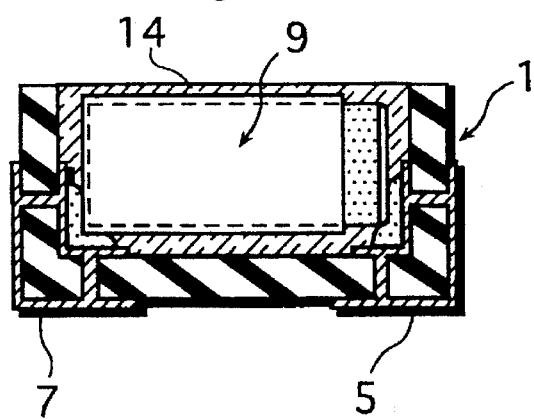
FIG. 9 is a front view, in vertical section, showing a package-type solid electrolytic capacitor according to a second embodiment of the present invention.

FIG. 9 shows a package-type solid electrolytic capacitor according to a second embodiment of the present invention. The capacitor of this embodiment is similar to that of the first embodiment (FIGS. 1–4) but differs therefrom in that an insulating resin 14 (e.g. epoxy resin) is poured into the housing recess of the package body 1 to close the upward opening of the housing recess, thereby enclosing the capacitor element 9 in combination with the package body 1.

According to the second embodiment, the insulating resin 14 need only be poured into the housing recess of the package body without any pressure application. Thus, it is possible to prevent the capacitor element 9 from suffering large stresses which would result from pressure application.

Figure 10:
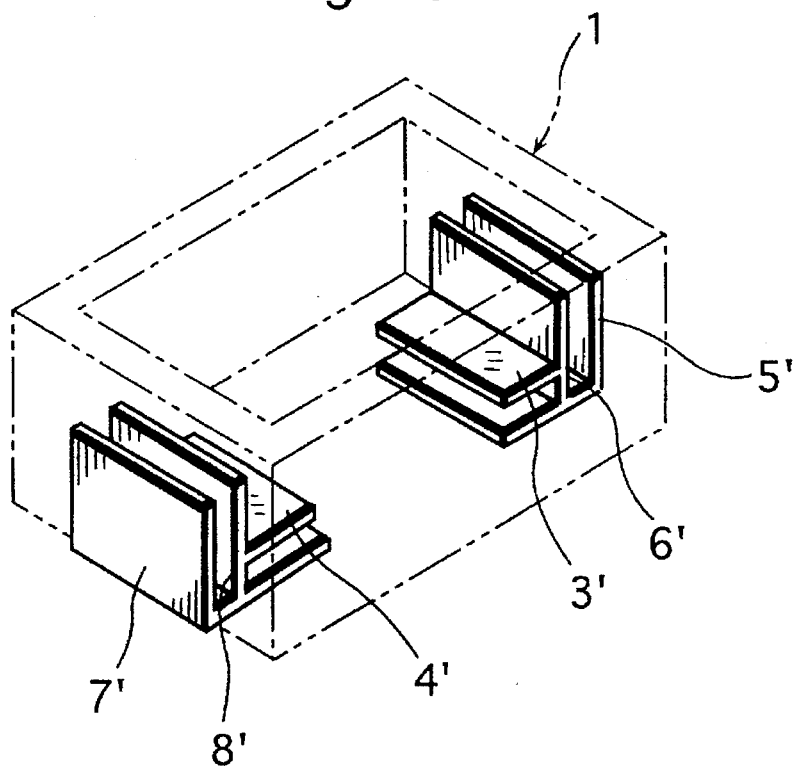
FIG. 10 is a perspective view showing a package body molded with electrodes according to a third embodiment of the present invention.

FIG. 10 shows a third embodiment wherein a package body 1 is molded with respective electrodes which include an anode-side internal electrode 3', a cathode-side internal electrode 2', an anode terminal electrode 5', and a cathode terminal electrode 7'. Each of the electrodes 3', 4', 5', 7' is made of a metal plate. The anode-side internal electrode 3' is connected to the anode terminal electrode 5' via a connecting web 6' which also works as a conductor part establishing electrical conduction between these electrodes 3', 5'. In a similar manner, the cathode-side internal electrode 4' is connected to the cathode terminal electrode 7' via a connecting web 8' which also works as a conductor part establishing electrical conduction between these electrodes 4', 7'.

Figure 11:
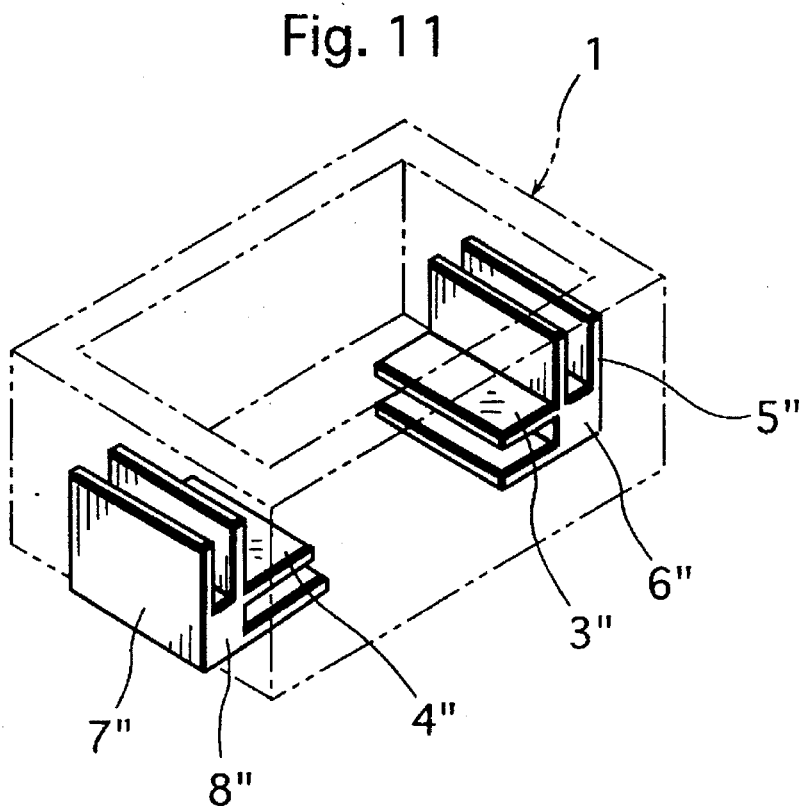
FIG. 11 is a perspective view showing a package body molded with electrodes according to a fourth embodiment of the present invention.

FIG. 11 shows a fourth embodiment wherein a package body 1 is again molded with respective electrodes which include an anode-side internal electrode 3", a cathode-side internal electrode 4", an anode terminal electrode 5", and a cathode terminal electrode 7". Each of the electrodes 3", 4", 5", 7" is made of a metal plate. The anode-side internal electrode 3" is connected to the anode terminal electrode 5" via a connecting block 6" which also works as a conductor part establishing electrical conduction between these electrodes 3", 5". In a similar manner, the cathode-side internal electrode 4" is connected to the cathode terminal electrode 7" via a connecting block 8" which also works as a conductor part establishing electrical conduction between these electrodes 4", 7".

Thought not specifically illustrated, either of the third and fourth embodiments described above is otherwise similar to the first embodiment shown in FIGS. 1–4. Further, each of the anode and cathode terminal electrodes 5', 5", 7', 7" may be made of a metal plate which itself can be easily soldered, or the metal plate may be plated with a metal coating (e.g. tin) to facilite soldering.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

I claim:

1. A package-type solid electrolytic capacitor comprising:

a capacitor element including a chip of compacted metal powder mass, an anode layer formed on a first end of the chip, and a cathode layer formed at least on a second end of the chip opposite to the first end;

an insulating package body having a housing recess with an upward opening for receiving the capacitor element, the housing recess being formed with an anode-side internal electrode in electrical conduction with the anode layer of the capacitor element, the anode-side internal electrode extending on a bottom surface of the housing recess and a first inner side surface of the housing recess, the housing recess being also formed with a cathode-side internal electrode in electrical conduction with the cathode layer of the capacitor element, the cathode-side internal electrode extending on the bottom surface of the housing recess and a second inner side surface of the housing recess opposite to the first inner side surface, the package body being externally formed with an anode terminal electrode in electrical conduction with the anode-side internal electrode, the package body being also externally formed with a cathode terminal electrode in electrical conduction with the cathode-side internal electrode;

an insulating closure means for closing the opening of the housing recess;

a first conductive deposit formed between the anode layer and the anode-side internal electrode, the first conductive deposit having an upright portion extending along the first inner side surface of the housing recess and a bottom portion extending along the bottom surface of the housing recess; and a second conductive deposit formed between the cathode layer and the cathode-side internal electrode, the second conductive deposit also having an upright portion extending along the second inner side surface of the housing recess and a bottom portion extending along the bottom surface of the housing recess.

2. The capacitor according to claim 1, wherein the closure means comprises a lid member attached to the package body to close the opening of the housing recess.

3. The capacitor according to claim 2, wherein the lid member is made of an insulating resin.

4. The capacitor according to claim 1, wherein the closure means comprises an insulating resin poured into the housing recess to a level of the opening of the housing recess.

5. The capacitor according to claim 1, wherein the package body is made of an insulating resin.

6. The capacitor according to claim 1, wherein each of the respective electrodes is formed by applying an electrically conductive paste onto the package body.

7. The capacitor according to claim 1, wherein the package body is made of a metal platable insulating resin, each of the respective electrodes being formed by plating the package body with a metal.

8. The capacitor according to claim 1, wherein each of the anode-side and cathode-side internal electrodes is electrically connected to a corresponding one of the anode and cathode terminal electrodes by at least one conductor part extending in a through-hole formed in a wall thickness of the package body.

9. The capacitor according to claim 1, wherein each of the electrodes is made of a metal plate, the package body is made of an insulating resin molded with the plate electrodes.

10. The capacitor according to claim 9, wherein each of the internal electrodes is electrically connected to a corresponding one of the terminal electrodes by a connecting web.

11. The capacitor according to claim 9, wherein each of the internal electrodes is electrically connected to a corresponding one of the terminal electrodes by a connecting block.

* * * * *